(12) United States Patent
Chang (10) Patent No.: US 9,839,183 B2
(45) Date of Patent: Dec. 12, 2017

(54) FLOWERPOT WITH WATER DISTRIBUTION DEVICE

(71) Applicant: SHENG SAN CO., LTD., Taichung (TW)

(72) Inventor: Cheng-Chung Chang, Taichung (TW)

(73) Assignee: Sheng San Co., Ltd., Taichung (TW)

( * ) Notice: Subject to any disclaimer, the term of this patent is extended or adjusted under 35 U.S.C. 154(b) by 77 days.

(21) Appl. No.: 14/157,776

(22) Filed: Jan. 17, 2014

(65) Prior Publication Data
US 2015/0096229 A1    Apr. 9, 2015

(30) Foreign Application Priority Data
Oct. 9, 2013    (TW) .............................. 102218933 U (51) Int. Cl.
*A01G 27/02*    (2006.01)
*A01G 27/00*    (2006.01)
*A01G 9/02*    (2006.01)

(52) U.S. Cl.
CPC ........... *A01G 27/005* (2013.01); *A01G 9/025* (2013.01); *Y02P 60/244* (2015.11)

(58) Field of Classification Search
CPC ...... A01G 9/022; A01G 27/00; A01G 27/005; A01G 27/02; A01G 27/04
See application file for complete search history.

(56) References Cited

U.S. PATENT DOCUMENTS

| 147,849 | A | * | 2/1874 | Leslie | A01G 9/022 119/246 |
|---|---|---|---|---|---|
| 194,677 | A | * | 8/1877 | Harper | A01G 9/022 47/39 |
| 217,010 | A | * | 7/1879 | Judson et al. | A01G 9/022 239/379 |
| 2,797,840 | A | * | 7/1957 | Gibbs | E05D 7/1077 16/262 |
| 3,108,401 | A | * | 10/1963 | Richardson | A01G 9/022 47/39 |
| 3,696,538 | A | * | 10/1972 | Nast | G03B 21/64 40/361 |
| 3,826,056 | A | * | 7/1974 | Smith | E04C 2/365 52/582.2 |

(Continued)

FOREIGN PATENT DOCUMENTS

WO    WO 2009126235 A1 * 10/2009 ........... A01C 23/042

Primary Examiner — Marc R Burgess
Assistant Examiner — Morgan T Barlow
(74) Attorney, Agent, or Firm — Muncy, Geissler, Olds & Lowe, P.C.

(57) ABSTRACT

A flowerpot assembly is provided a support including a plurality of equally spaced openings from top to bottom; and a plurality of flowerpots each disposed on the opening and including a container and a conduit wherein the container includes a storing section for anchoring a plant and a water distribution device on a bottom of the storing section, the water distribution device including a coupling, a wall, an inlet, and an overflow exit; wherein a bottom of the conduit is connected to the water distribution device; wherein the inlet communicates the conduit with the storing section; wherein the wall is around the coupling; and wherein the overflow exit is between the water distribution device and the wall and extends out of the container.

1 Claim, 8 Drawing Sheets

(56) References Cited

U.S. PATENT DOCUMENTS

| | | | | |
|---|---|---|---|---|
| 3,841,023 A * | 10/1974 | Carlyon, Jr. | A01G 9/023 | 239/20 |
| 3,931,894 A * | 1/1976 | Murphy | A47F 5/04 | 211/163 |
| 4,006,559 A * | 2/1977 | Carlyon, Jr. | A01G 9/023 | 137/575 |
| 4,216,617 A * | 8/1980 | Schmidt | A01G 31/06 | 47/62 A |
| 4,389,813 A * | 6/1983 | Jaques | A01G 9/022 | 428/18 |
| 4,718,561 A * | 1/1988 | Eckert | A47F 7/021 | 211/194 |
| 4,991,345 A * | 2/1991 | Bloch | A01G 27/00 | 47/65.5 |
| 5,251,399 A * | 10/1993 | Rasmussen | A01G 9/023 | 211/88.03 |
| 5,265,376 A * | 11/1993 | Less | A01G 9/022 | 47/83 |
| 5,502,922 A * | 4/1996 | Shlomo | A01G 9/023 | 47/39 |
| 5,529,205 A * | 6/1996 | Corney | B65D 43/164 | 220/832 |
| 5,598,662 A * | 2/1997 | Droste | A47G 7/041 | 47/39 |
| 6,338,419 B1 * | 1/2002 | Penney | A01G 9/022 | 220/475 |
| 6,470,625 B1 * | 10/2002 | Byun | A01G 9/023 | 47/82 |
| 6,557,297 B2 * | 5/2003 | Receveur | A47G 7/041 | 47/39 |
| 6,647,562 B1 * | 11/2003 | Arout | E04H 4/0043 | 4/506 |
| D653,156 S * | 1/2012 | Phelps | D11/143 | |
| 2002/0129551 A1 * | 9/2002 | Kemp | A47F 7/0078 | 47/83 |
| 2002/0170979 A1 * | 11/2002 | Martinez | F24F 13/222 | 239/200 |
| 2005/0223665 A1 * | 10/2005 | Maas | E04H 1/1272 | 52/239 |
| 2005/0262768 A1 * | 12/2005 | Cybula | A01G 9/023 | 47/83 |
| 2006/0150505 A1 * | 7/2006 | Wang | A01G 27/008 | 47/79 |
| 2009/0000189 A1 * | 1/2009 | Black | A01G 27/02 | 47/82 |
| 2009/0255180 A1 * | 10/2009 | Felknor | A01G 27/005 | 47/62 N |
| 2010/0320291 A1 * | 12/2010 | Chen | A01G 27/04 | 239/450 |
| 2011/0179708 A1 * | 7/2011 | Stewart | A01G 27/04 | 47/65.9 |
| 2012/0047801 A1 * | 3/2012 | Hogan | A01G 9/022 | 47/66.6 |
| 2012/0227320 A1 * | 9/2012 | Dos Santos | A01G 9/025 | 47/79 |
| 2012/0240458 A1 * | 9/2012 | Ganske | A47G 7/041 | 47/39 |
| 2012/0279127 A1 * | 11/2012 | Yusibov | A01G 31/06 | 47/62 N |
| 2013/0061521 A1 * | 3/2013 | Cudmore | A01G 9/023 | 47/83 |
| 2013/0111812 A1 * | 5/2013 | Fisher | A01G 9/023 | 47/66.7 |
| 2013/0318872 A1 * | 12/2013 | van der Starre | A01G 9/02 | 47/66.6 |
| 2014/0109473 A1 * | 4/2014 | Sung | A01G 9/025 | 47/39 |
| 2015/0000746 A1 * | 1/2015 | Peterson | A47G 33/12 | 137/1 |
| 2015/0128494 A1 * | 5/2015 | Peterson | A01G 9/023 | 47/82 |

* cited by examiner

FLOWERPOT WITH WATER DISTRIBUTION DEVICE

BACKGROUND OF THE INVENTION

1. Field of the Invention

The invention relates to flowerpots and more particularly to a flowerpot having a water distribution device capable of evenly distributing water to an immediately lower flowerpot.

2. Description of Related Art

With the rapid increase in population, it results in a large amount of land to be developed into a residential, commercial or industrial land. This in turn significantly reduces people exposure to the green. Thus, there are more and more people not only use the balcony or attic space to plant flowers but also grow plants on the walls of construction sites. This has the benefits of beautifying the environment and adjusting the temperature and further more effectively relieving pressures of work and life.

Taiwan Utility Model No. M370927 entitled "vertically disposed flowerpots configured to change positions" discloses a plurality of flowerpot supported by a support having a plurality of assembled units. However, individually watering the flowerpots is required. It is cumbersome. A person may water the topmost flowerpot and allow the excess water to flow from a bottom of the topmost flowerpot to a next lower one. However, the topmost flowerpot may die due to excess of water.

Notwithstanding the prior art, the invention is neither taught nor rendered obvious thereby.

SUMMARY OF THE INVENTION

It is therefore one object of the invention to provide a flowerpot having a water distribution device capable of evenly distributing water to an immediately lower flowerpot.

For achieving above and other objects, the invention provides a flowerpot assembly comprising a support comprising a plurality of equally spaced openings from top to bottom; and a plurality of flowerpots each disposed on the opening and comprising a container and a conduit wherein the container comprises a storing section for anchoring a plant and a water distribution device on a bottom of the storing section, the water distribution device including a coupling, a wall, an inlet, and an overflow exit; wherein a bottom of the conduit is connected to the water distribution device; wherein the inlet communicates the conduit with the storing section; wherein the wall is around the coupling; and wherein the overflow exit is between the water distribution device and the wall and extends out of the container.

The above and other objects, features and advantages of the invention will become apparent from the following detailed description taken with the accompanying drawings.

DETAILED DESCRIPTION OF THE INVENTION

Referring to FIGS. 1 to 8, a flowerpot assembly 100 in accordance with the invention comprises the following components as discussed in detail below.

Figure 1:
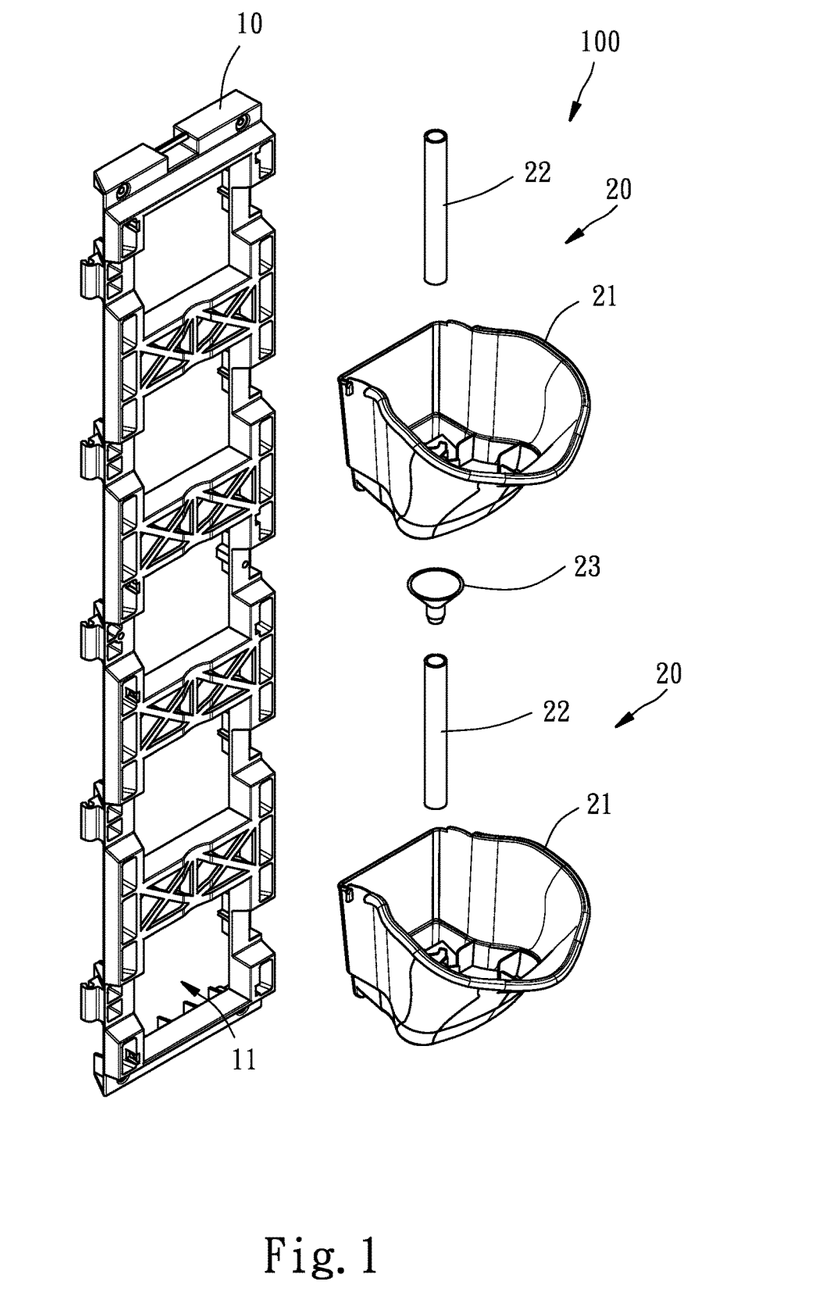
FIG. 1 is an exploded view of a flowerpot assembly according to the invention.
Figure 2:
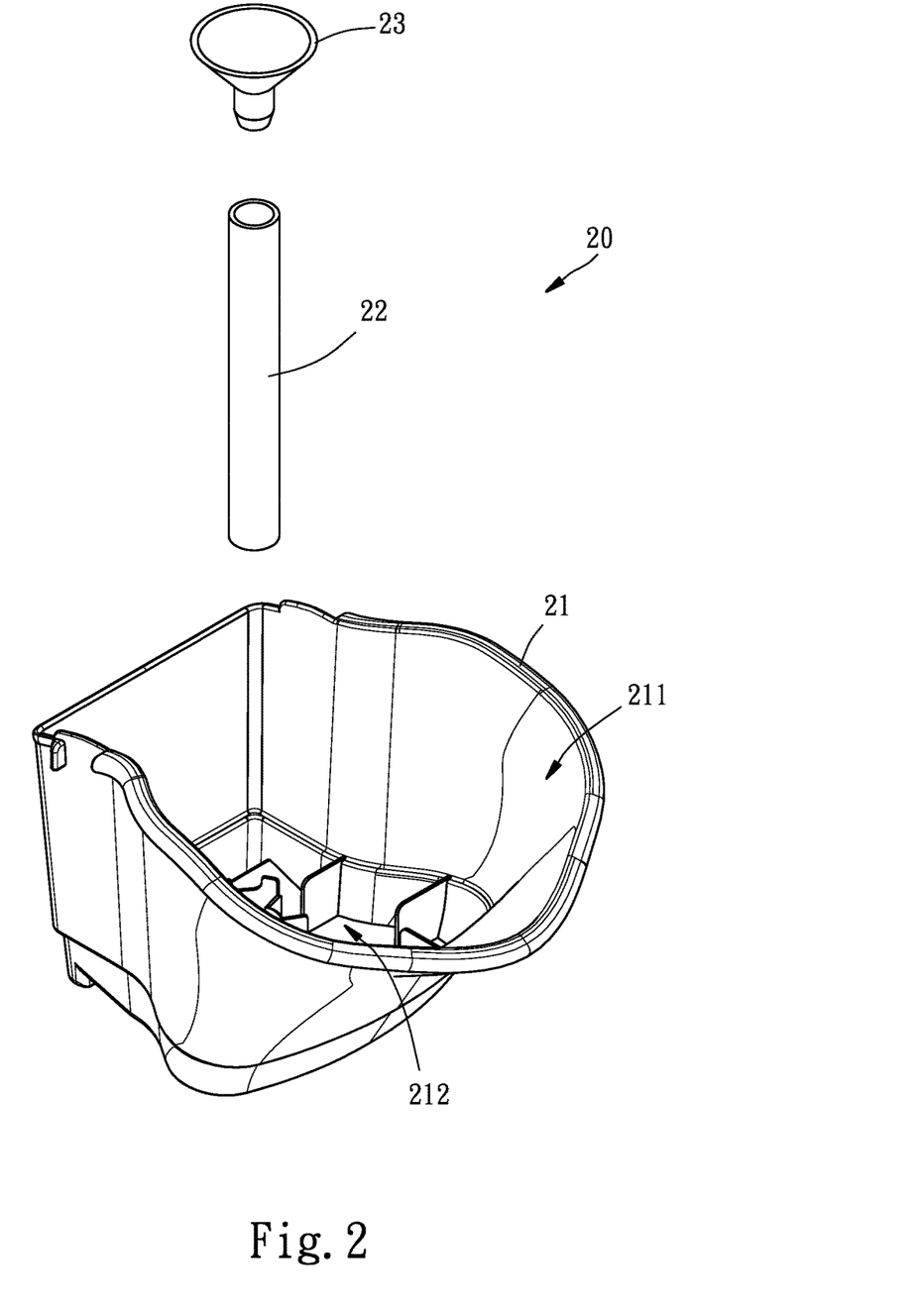
FIG. 2 is an exploded view of one of a plurality flowerpots of the flowerpot assembly.
Figure 3:
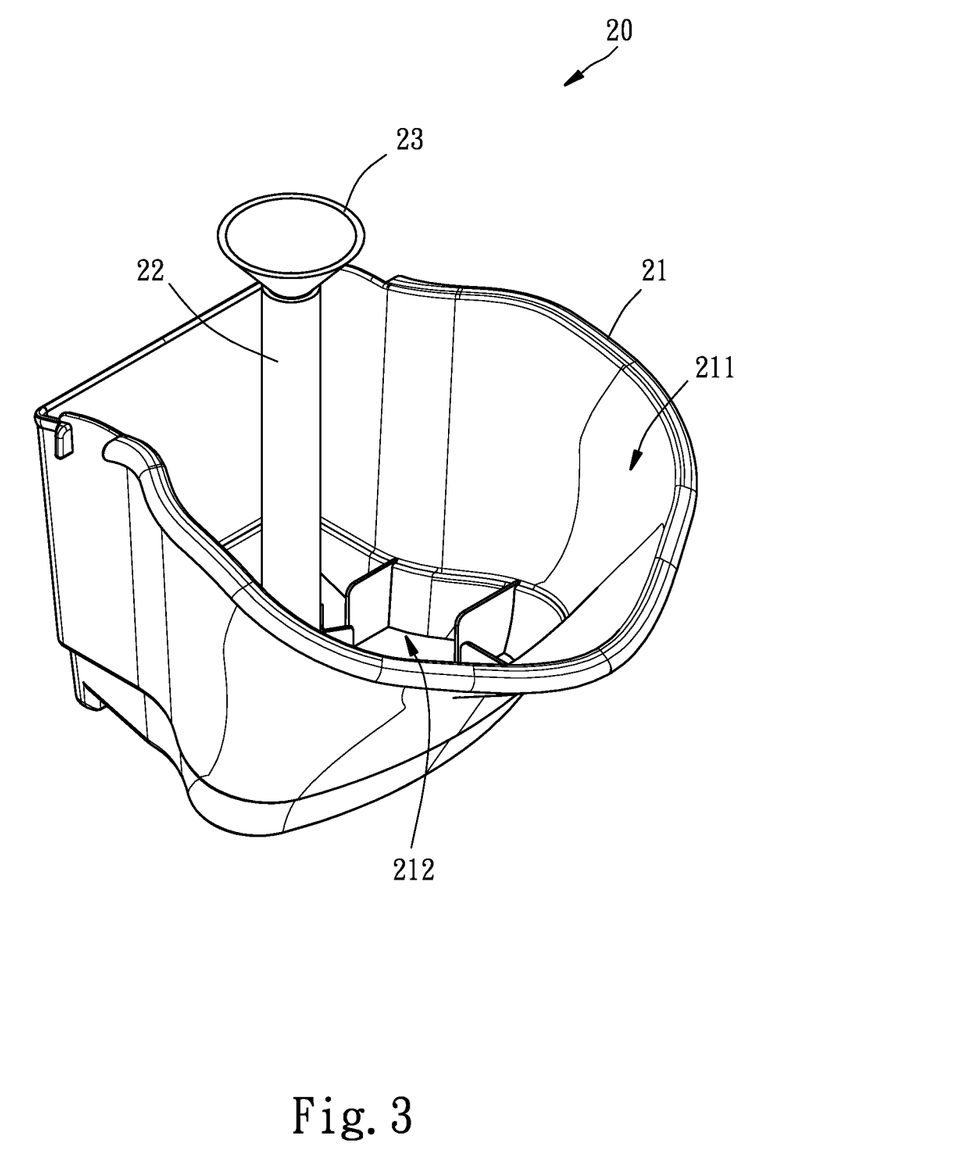
FIG. 3 is a perspective view of the assembled flowerpot.
Figure 4:
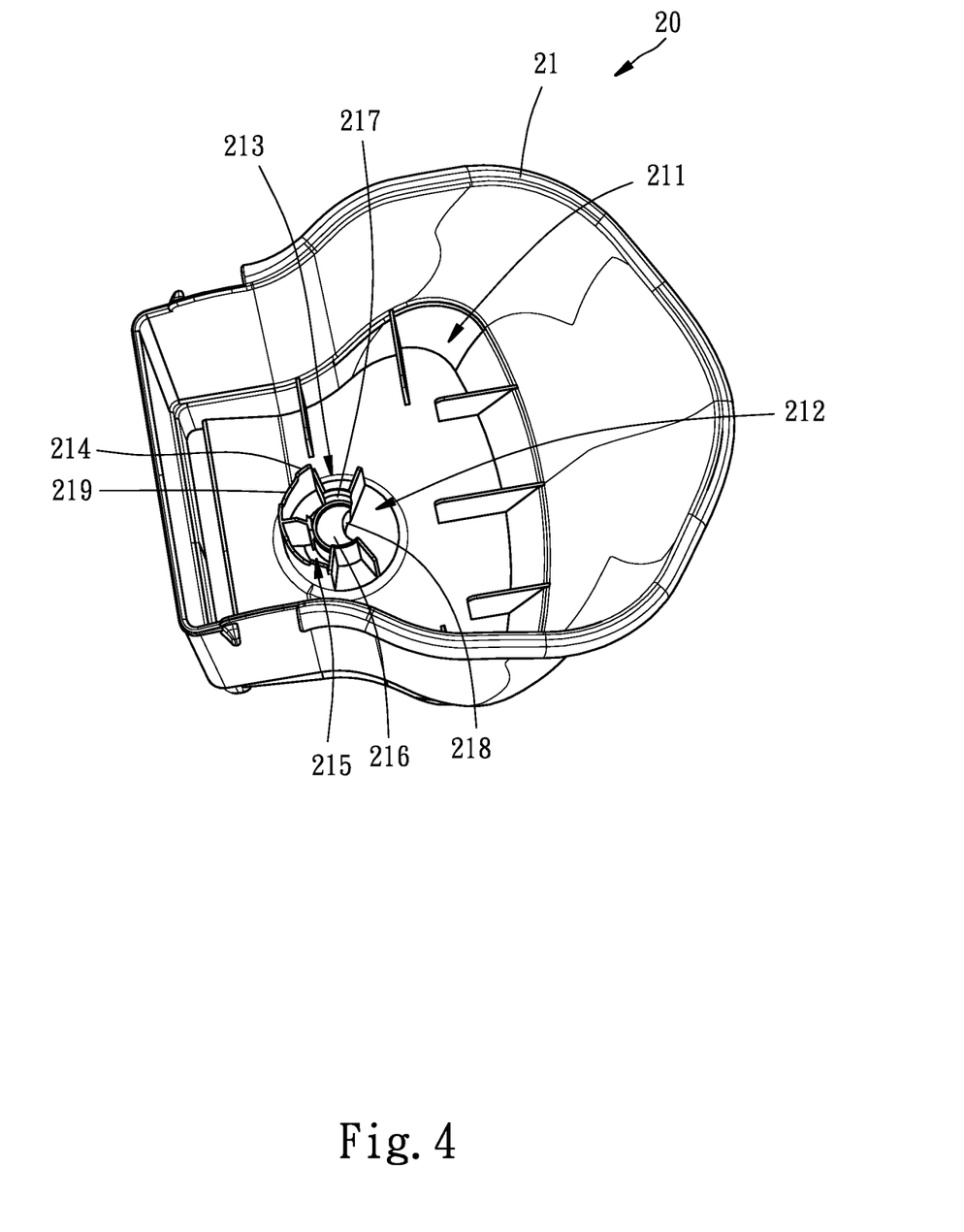
FIG. 4 is a perspective view of the flowerpot of FIG. 3 with both the conduit and the funnel removed.

A rectangular support 10 is made of molded plastic and comprises a plurality of openings 11 disposed from top to bottom. A plurality of flowerpots 20 each comprises a container 21, a conduit 22, and a funnel 23. The container 21 is made of molded plastic and comprises a storing section 211 for storing a growing medium such as soil with roots of a plant anchored therein, and a water distribution device 212 on a bottom of the storing section 211. The water distribution device 212 comprises a coupling 213, a wall 214, and an overflow exit 215. The coupling 213 comprises a crescent bottom 216 and a plurality of spaced wall sections 217 around a portion of the bottom 216. An inlet 218 is formed on an edge of the bottom 216 and communicates with the storing section 211. The wall 214 is around the coupling 213 and has a recess 219 on a top. The overflow exit 215 is between the wall 214 and the coupling 213. The overflow exit 215 communicates the bottom of the container 21 with the external. Bottom of the conduit 22 is inserted into the coupling 213 to be fastened by the bottom 216 and the wall sections 217. Further, the conduit 22 communicates with the inlet 218. The narrow stem of the funnel 23 is fastened in a top of the conduit 22. The funnel 23 has a wide, conical mouth.

Figure 5:
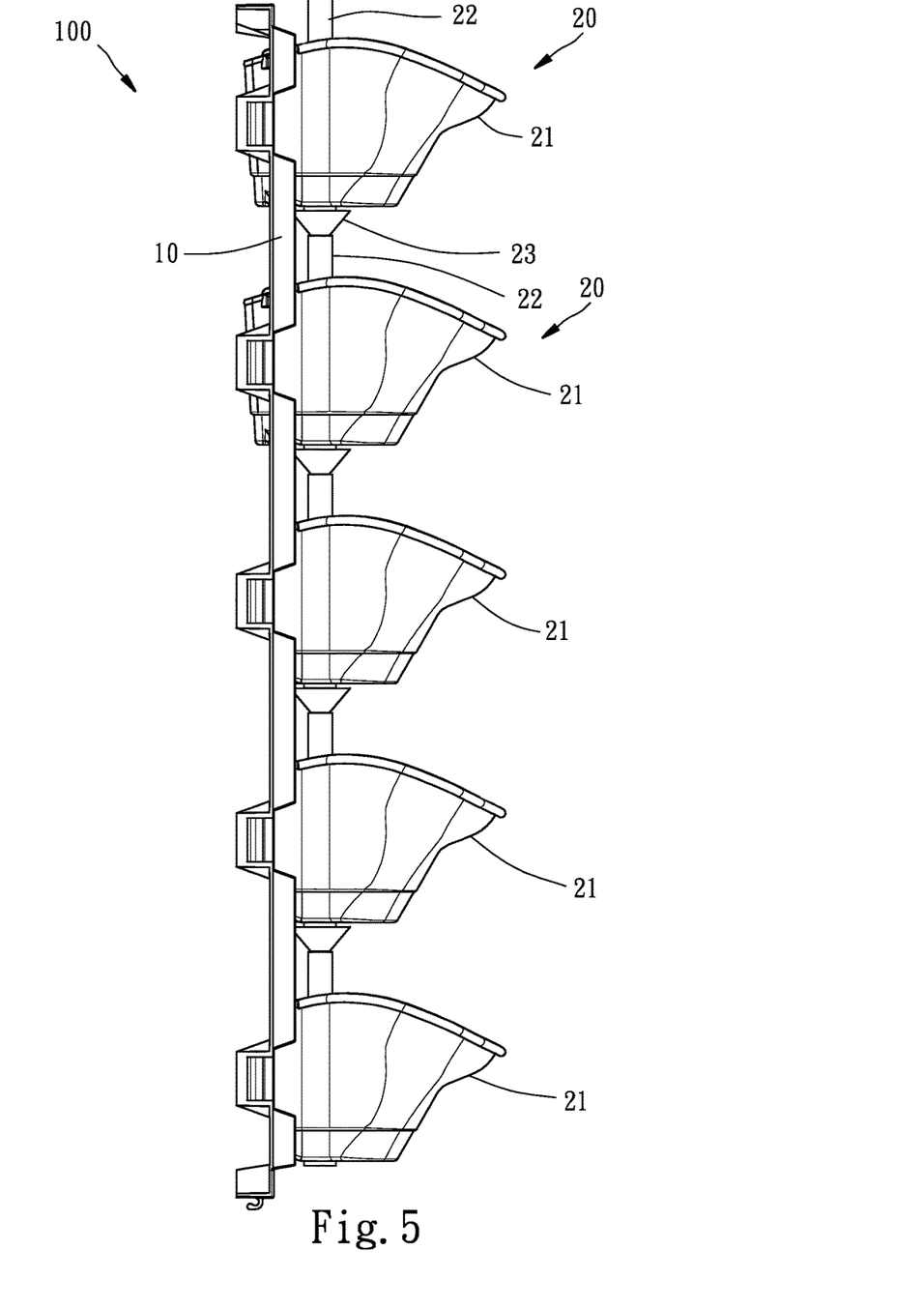
FIG. 5 is a side elevation of the flowerpot assembly.
Figure 6:
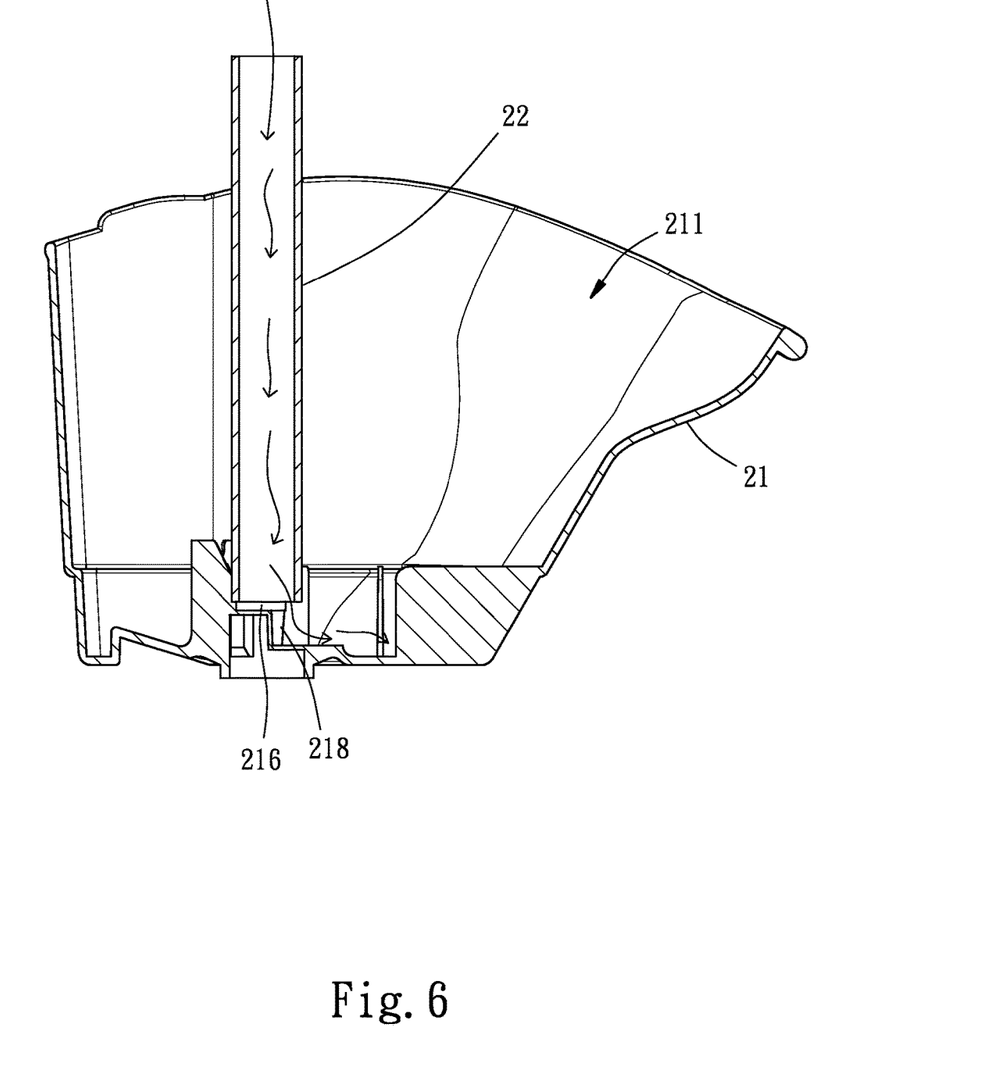
FIG. 6 is a longitudinal sectional view of the flowerpot.
Figure 7:
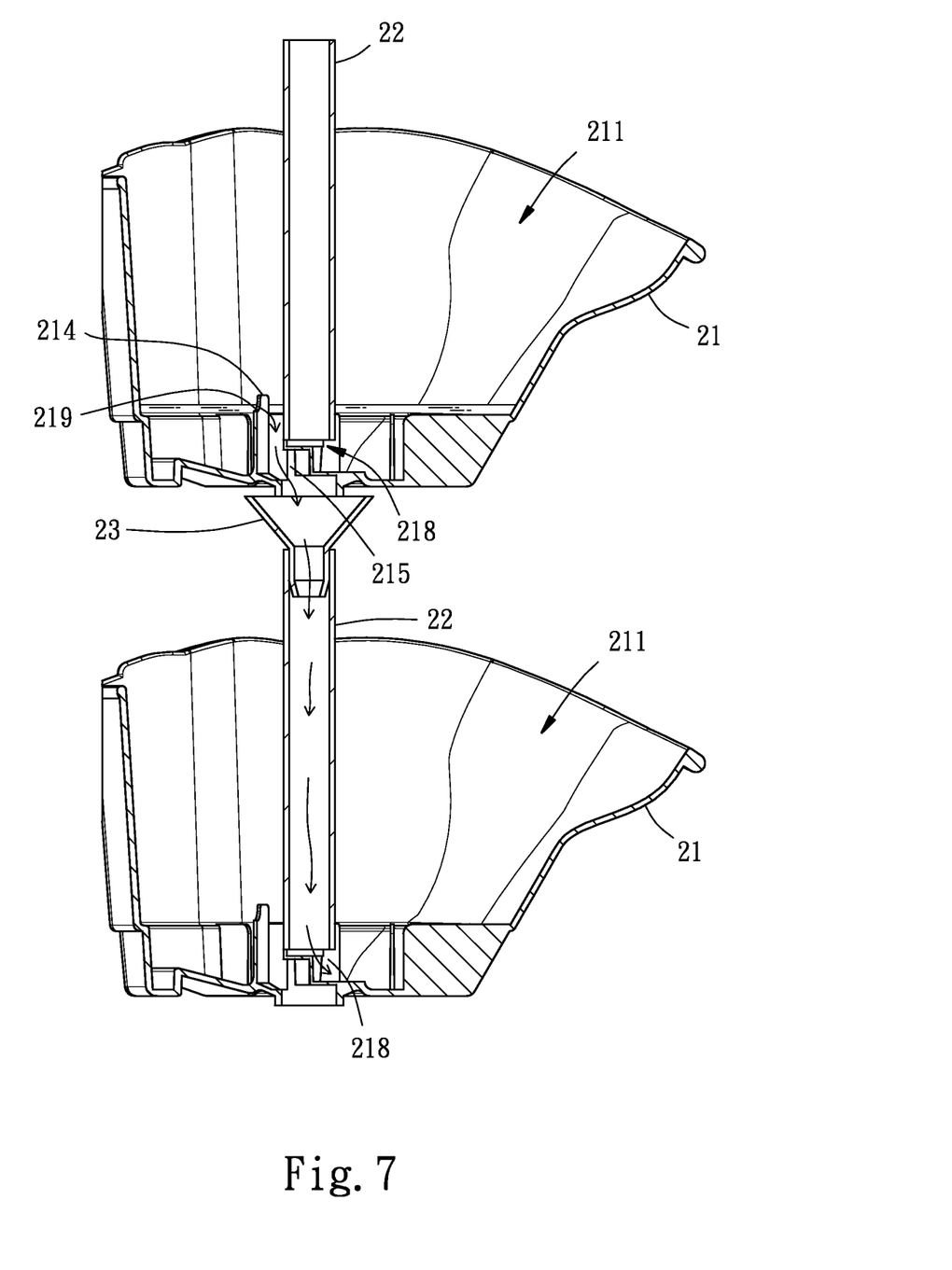
FIG. 7 is a longitudinal sectional view of two adjacent flowerpots.
Figure 8:
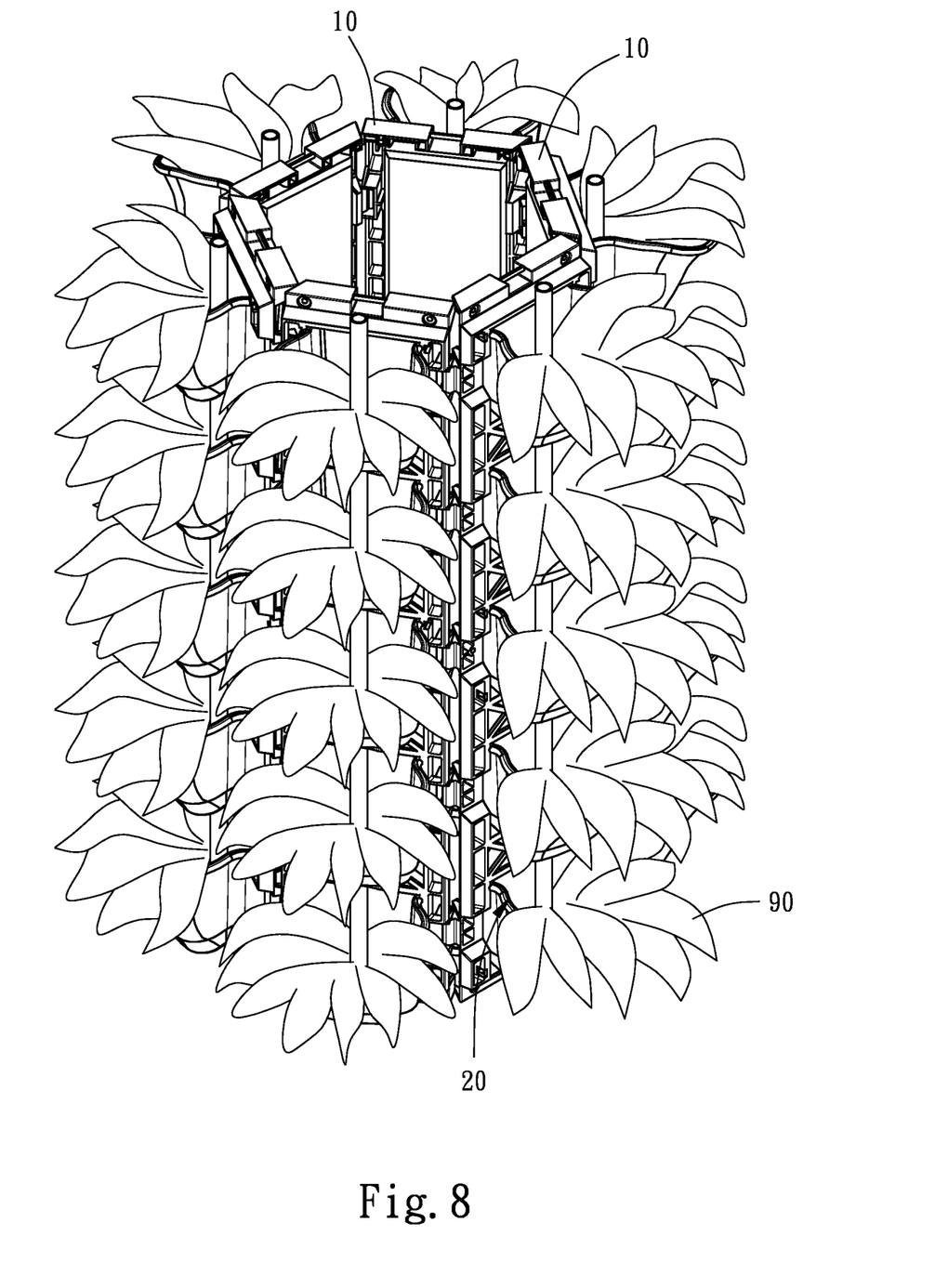
FIG. 8 is a perspective view of six flowerpot assemblies assembled as a hexagonal structure in one embodiment.

As shown in FIG. 5, the flowerpots 20 are each fastened in the opening 11. The top of the topmost conduit 22 is without the funnel 23. Each of the other flowerpots 20 has an external funnel 23 fastened in a top of a conduit 22 of an immediately lower flowerpot 20 and the wide, conical mouth of the funnel 23 is directly below the overflow exit 215. As shown in FIG. 6, water flowing in the conduit 22 may enter the inlet 218 to flow into a bottom of the storing section 211. Water can be absorbed by the soil and a plant 90 may ingest nutrients directly from the soil through their roots (see FIG. 8).

Water may flow over the recess 219 to flow to the overflow exit 215 when water level in the storing section 211 is higher than the recess 219. And in turn, water leaving the overflow exit 215 flow to the bottom of the container 21 and further to the funnel 23. And in turn, water flows to the conduit 22 prior to flowing to an immediately lower flowerpot 20. As a result, water is evenly distributed to all flowerpots 20 with plants 9 being sufficiently watered.

While the invention has been described in terms of preferred embodiments, those skilled in the art will recognize that the invention can be practiced with modifications within the spirit and scope of the appended claims.

What is claimed is:

1. A flowerpot comprising:
a container comprising
a storing section for anchoring a plant and
a water distribution device fastened on a bottom of the storing section, the water distribution device further comprising a coupling,
a wall comprising at least one top recess, an inlet, and an overflow exit;
wherein a bottom of the storing section is directly connected to the inlet, wherein the wall particularly surrounds the coupling and wherein the overflow exit is between the coupling and the wall and extends out of a conduit having a bottom which terminates in the water distribution device and communicates with the inlet; and a funnel comprising:

a narrow stem fastened directly to a top of the conduit, and a conical mouth.

\* \* \* \* \*